United States Patent
Caratiola

(10) Patent No.: US 11,541,953 B2
(45) Date of Patent: Jan. 3, 2023

(54) BICYCLE RACK, SINGLE BICYCLE RACK AND BICYCLE RACK SYSTEM

(71) Applicant: Canyon Bicycles GmbH, Koblenz (DE)

(72) Inventor: Nicolas Caratiola, Koblenz (DE)

(73) Assignee: Canyon Bicycles GmbH, Koblenz (DE)

(*) Notice: Subject to any disclaimer, the term of this patent is extended or adjusted under 35 U.S.C. 154(b) by 6 days.

(21) Appl. No.: 17/115,960

(22) Filed: Dec. 9, 2020

(65) Prior Publication Data

US 2021/0171142 A1 Jun. 10, 2021

(30) Foreign Application Priority Data

Dec. 10, 2019 (DE) .................. 20 2019 106 880.9

(51) Int. Cl.
*B62H 3/06* (2006.01)
*F16B 2/12* (2006.01)

(52) U.S. Cl.
CPC ............... *B62H 3/06* (2013.01); *F16B 2/12* (2013.01)

(58) Field of Classification Search
CPC ... B62H 3/00; B62H 3/04; B62H 3/06; B62H 3/08; B62H 3/10; F16B 2/12; B60P 3/077
USPC .................................................. 211/22, 24
See application file for complete search history.

(56) References Cited

U.S. PATENT DOCUMENTS

| | | | | |
|---|---|---|---|---|
| 342,187 A * | 5/1886 | Cornell | .................. | B25B 11/00 211/24 |
| 519,016 A * | 5/1894 | De Clairmont | .......... | B62H 3/00 211/175 |
| 803,196 A * | 10/1905 | Shearman | ................ | B62H 3/08 211/20 |
| 1,722,796 A * | 7/1929 | Henle | ....................... | A47F 7/04 211/24 |
| 3,510,007 A * | 5/1970 | Rademacher | .............. | A47F 7/04 211/24 |
| 3,603,459 A * | 9/1971 | Erb | ........................... | B62H 3/08 211/20 |
| 3,912,139 A * | 10/1975 | Bowman | ................... | B60R 9/10 224/403 |
| 4,050,583 A * | 9/1977 | Szabo | ...................... | B62H 3/08 211/20 |
| 4,830,167 A * | 5/1989 | Lassche | .................... | B62H 3/00 70/225 |
| 5,749,475 A * | 5/1998 | Krebs | ....................... | A47F 7/04 211/23 |
| 6,755,309 B1 * | 6/2004 | Runge | ...................... | B62H 3/04 211/183 |

(Continued)

FOREIGN PATENT DOCUMENTS

DE 202019003504 U1 11/2019
EP 3050783 A1 * 8/2016

(Continued)

*Primary Examiner* — Patrick D Hawn
(74) *Attorney, Agent, or Firm* — The Webb Law Firm

(57) ABSTRACT

A bicycle rack with a wheel fixing means for fixing a wheel of a bicycle. The wheel fixing means comprises a receiving space for receiving the wheel in a clamping manner. The width of the receiving space can be varied to receive different wheel widths. Further, a single bicycle rack with only one such bicycle rack is provided. Moreover, a bicycle rack system with at least two such bicycle racks is provided which are connected with each other.

16 Claims, 4 Drawing Sheets

(56) References Cited

U.S. PATENT DOCUMENTS

| | | | | |
|---|---|---|---|---|
| 6,866,282 | B2* | 3/2005 | Heerspink | B62H 3/08 |
| | | | | 211/20 |
| 6,868,976 | B1* | 3/2005 | Lassanske | B62H 3/08 |
| | | | | 211/21 |
| 7,325,816 | B2* | 2/2008 | Johnson | B60S 13/00 |
| | | | | 211/20 |
| 8,757,604 | B2* | 6/2014 | Crampton | F16M 11/22 |
| | | | | 269/95 |
| 8,800,786 | B2* | 8/2014 | Parkins | F16M 11/02 |
| | | | | 211/195 |
| 10,618,582 | B1* | 4/2020 | Liu | B62H 3/06 |
| 10,850,784 | B1* | 12/2020 | Hamilton | B62H 3/08 |
| 10,858,055 | B2* | 12/2020 | Drew | B62K 3/14 |
| 2005/0175968 | A1 | 8/2005 | Milner | |
| 2007/0017882 | A1* | 1/2007 | Lewis | B62H 3/08 |
| | | | | 211/20 |
| 2009/0107932 | A1* | 4/2009 | Henthorn | B62H 3/08 |
| | | | | 211/20 |

FOREIGN PATENT DOCUMENTS

| | | | |
|---|---|---|---|
| JP | 2005254853 A | 9/2005 |
| JP | 2007331726 A | 12/2007 |
| JP | 2012204169 A | 10/2012 |
| KR | 101125068 A | 3/2012 |

* cited by examiner

BICYCLE RACK, SINGLE BICYCLE RACK AND BICYCLE RACK SYSTEM

CROSS-REFERENCE TO RELATED APPLICATION

This application claims priority to German Patent Application No. 20 2019 106 880.9 filed Dec. 10, 2019, the disclosure of which is hereby incorporated by reference in its entirety.

BACKGROUND OF THE INVENTION

The present invention relates to a bicycle rack, a single bicycle rack as well as to a bicycle rack system.

A bicycle rack, also referred to as bicycle parking rack or bicycle stand, is a device for parking bicycles. These should be differentiated from devices such as bicycle kick-stands, for example, which are in particular fixedly connected with the bicycle. Thus, bicycle racks are devices separate from the bicycle into which the bicycle can be placed or pushed, thereby allowing for the parking of the bicycle.

A simple and widely used design of a bicycle rack is the rim clamper. Common rim clampers comprise two wire brackets arranged in parallel or in a funnel-shape, into which the wheel of a bicycle, in particular the front wheel, is pushed and is thereby held by clamping. Such rim clampers are disadvantageous in that bicycles with narrow wheels, e.g. racing bicycles, will not find a hold therein and/or bicycles with wide wheels, such as fatbikes, will not fit into the clamping means, so that the bicycles can be supported only insufficiently or not at all.

It is an object of the invention to provide a bicycle rack, a single bicycle rack as well as a bicycle rack system, in which parking of bicycles with different wheel widths is improved.

The object is achieved with a bicycle rack as defined in claim 1, a single bicycle rack as defined in claim 14, as well as a bicycle rack system as defined in claim 15.

The bicycle rack of the invention comprises a wheel fixing means for fixing the wheel of a bicycle. The wheel fixing means comprises a receiving space for clampingly receiving the wheel of the bicycle. It is preferred that the receiving space substantially has a pitch-circle shape and thus reflects in particular the shape of the bicycle tire. In this manner, the clamping is effected preferably only on the rubber of the bicycle tire so that no contact is made with the rim. The width of the receiving space is variable to accommodate different wheel widths of the bicycle wheel. Thus, the width of the receiving space can be reduced or enlarged, respectively. It is particularly preferred that the width of the receiving space can be changed in a stepless manner. The receiving space is preferably designed to be open to at least one side so that the wheel of the bicycle may be introduced into the receiving space via this opening. This at least one opening preferably is an upward directed opening if the bicycle rack is positioned on a surface, in particular a ground surface. As an alternative or in addition, the receiving space is open to another side, which preferably is a side of the bicycle rack in the longitudinal direction, if the bicycle rack is positioned on a surface, in particular a ground surface. It is particularly preferred that the receiving space is open to both longitudinally directed sides. Via the opening on one or both longitudinal directed sides of the receiving space it is preferably possible to introduce, in particular to push the bicycle wheel into the receiving space from one or both sides. The opening on one or both longitudinally directed sides of the receiving space could, in other words, be referred to as a receiving passage. In a preferred embodiment, the receiving space is narrowed or closed in case of an opening on one or both longitudinally directed sides, e.g. by means of at least one strut and/or at least one protrusion. By means of this narrowing and/or closure of the receiving space on one or both longitudinally directed sides, it is achieved in an advantageous manner that the bicycle wheel may be easy to introduce into the receiving space, while the wheel is prevented from rolling out on one or both sides. Due to the variable width of the receiving space, it is achieved in an advantageous manner that bicycles with different wheel widths can be parked in the bicycle rack. It is particularly preferred that the width of the entire bicycle rack is designed to be variable. In this particularly preferred embodiment in which the entire bicycle rack is designed to be variable in width, it is achieved in an advantageous manner that the entire bicycle rack can be compressed. Thus, it is achieved, for example, that the bicycle rack can be stowed away and/or transported more easily.

In a preferred embodiment the bicycle rack has a hinge device for changing the width of the receiving space. It is particularly preferred that the hinge device is designed such that a change of the width of the entire bicycle rack is effected via the same. It is particularly preferred that the bicycle rack has no rails, in particular with a view to changing the width of the receiving space. Accordingly, it is preferred in a rail-free design that the bicycle rack comprises no rail, specifically no rail guiding.

In a preferred embodiment the hinge device has a scissors hinge or a telescopic device or a hinge arm. It is particularly preferred that the hinge device is formed by the scissors hinge or the telescopic device or the hinge arm. Here, the scissors hinge is preferably designed as a pantograph.

In a preferred embodiment the bicycle rack has a raised holder for an elevated positioning of the bicycle wheel. Preferably, this is a point-wise raised holder so that the bicycle wheel is supported at points, i.e. at at least one support point. It is particularly preferred that the raised holder is a two-point raised holder, so that the bicycle wheel is supported at, in particular exactly two support points. The raised holder is designed such that the bicycle wheel is supported elevated, i.e. preferably spaced from a surface, in particular a surface on which the bicycle rack is arranged. In other words. the bicycle wheel is preferably "held in the air" by the raised holder. In particular, the raised holder comprises at least one positioning surface on which the bicycle wheel can be positioned. Practical tests have shown that by raising the wheel, a substantially better clamping is achieved than with bicycle racks of the prior art without raised holding. In addition, it is also prevented in particular that the rim of the bicycle itself is clamped. Especially with high-quality rims, a clamping of the rims themselves is not desired.

It is preferred that the wheel fixing means comprises two opposing, preferably parallel fixing bodies for forming the receiving space. Preferably, each of the fixing bodies comprises, in particular consists of a bracket or a surface. For changing the width of the receiving space, the distance of the fixing bodies from each other is variable, in particular by means of the hinge device. It is particularly preferred that the fixing bodies are connected such that they are movable relative to each other, in particular via the hinge device. Preferably, the fixing bodies are connected with each other only by the hinge device. The fixing bodies are designed in particular for fixing the tire of the bicycle wheel, in particular by clamping. It is particularly preferred that a clamping of only the tire is effected and thus, in particular no contact with the rim of the wheel occurs. Preferably, the fixing bodies comprises a fixing surface, in particular comprising rubber, for fixing the tire of the wheel. The fixing bodies and/or the fixing surfaces are preferably designed substantially with a pitch-circle shape. Thus, it is preferred that the same pick up the shape of the bicycle tire. In this manner, the clamping preferably occurs only at the rubber of the bicycle tire so that there is no contact with the rim.

Each of the fixing bodies preferably comprises a side wall. The side wall is designed in particular to be plane. It is preferred that the side walls are designed substantially with a pitch-circle shape. By means of the side wall, in particular the plane side wall, it is advantageously achieved that, when the bicycle wheel is clamped by the two side walls, a plane clamping occurs and thus, the clamping force is distributed over a large surface of the wheel, preferably only at the tire, without rim contact. In contrast to bicycle racks of the prior art, this results in an optimal clamping of the wheel and/or in a minimized risk of bending the wheel in case the wheel or the entire bicycle should tilt.

In a preferred embodiment the wheel fixing means comprises rubber, in particular elastomer, for a clamped holding of the bicycle wheel. Advantageously the rubber is arranged such that, when the bicycle is held in the bicycle rack, the rubber is allocated to the bicycle wheel held clamped. It is preferred that the fixing bodies comprise rubber. It is particularly preferred that the side walls comprise rubber, in particular all over their surfaces. If the side walls are realized using rubber, it is preferred that the side walls are rubberized at least on the side directed to the wheel. The rubber provides the advantage that scratches, in particular in the rim, are prevented and/or the friction of the clamping is increased.

It is preferred that the hinge device connects the fixing bodies in a movable manner. It is preferred that the hinge device is arranged, in particular completely, between the fixing body and thus does preferably not extend beyond the dimensions the receiving space defined by the fixing bodies. With this arrangement of the hinge device between the fixing bodies a compact design of the bicycle rack is obtained, on the one hand, and/or on the other hand, a change of width of the entire bicycle rack is possible.

It is preferred that the bicycle rack comprises a pre-tensioning device. The pre-tensioning device is designed in particular such that it pushes the fixing bodies towards each other. It is particularly preferred that the pre-tensioning device is arranged between the fixing bodies and in particular connects fixing bodies. The pre-tensioning device preferably comprises a spring, in particular a tension spring, the device being in particular formed by such a spring. The pre-tensioning device advantageously allows for an automatic reduction of the receiving space width and thus e.g. an automatic clamping of the bicycle wheel and/or an automatic compression of the bicycle rack is effected.

It is preferred that the raised holder is connected with the fixing bodies, preferably fixedly and, as is particularly preferred, integrally.

In a preferred embodiment at least one protrusion is arranged between the fixing bodies. The at least one protrusion is designed in particular such that it narrows or closes the receiving space preferably on at least one longitudinally directed side. In particular the at least one protrusion thus ends the receiving space on that side. It is particularly preferred that at least one protrusion narrows or closes the receiving space on both longitudinally directed sides, respectively. It is preferred that this narrowing and/or closing by means of protrusions corresponds to the above described narrowing and/or closing. The at least one protrusion is, in particular, designed as a spacer and/or as a wheel support for the bicycle wheel and/or forms the raised holder. If the at least one protrusion is designed as a spacer, the protrusion defines a minimum distance between the two fixing bodies and thus defines a minimum width of the receiving space. If the at least one protrusion is designed as a wheel support, the tread of the bicycle wheel can be in contact with the protrusion on one or both sides, when the wheel is fixed in the bicycle rack. Thus, the wheel is prevented in an advantageous manner from rolling out on the longitudinally directed side. In the embodiment in which the at least one protrusion forms the raised holder, the at least one protrusion keeps in particular the bicycle wheel in a raised position. It is particularly preferred that at least one, preferably two protrusions are connected, in particular integrally, with each of the fixing bodies, respectively. It is particularly preferred that the protrusions of the two fixing bodies respectively oppose each other with their end faces. It is preferred that the fixing body has a height of 10 to 15 mm, in particular a height of 11 mm.

In a preferred embodiment the width of the receiving space can be changed variably in a range from 0 to 150 mm, preferably between 22 and 130 mm. This variable width of the receiving space advantageously allows to hold most of the common wheel widths.

It is preferred that the bicycle rack, in particular the hinge device, comprises a blocking device. The blocking device is designed such that the width of the receiving space can be fixed, preferably temporarily. The blocking device preferably comprises at least one screw or a fast blocking device and is in particular formed thereby. It is particularly preferred that the blocking device blocks the hinge device so that the same is immovable. By means of the blocking device it is it is achieved in an advantageous manner that on the one hand, the receiving space can be set to a certain width and thus a certain wheel width can be set and/or, on the other hand, a fixed press fitting of the bicycle wheel in the wheel fixing means can be effected.

In a preferred embodiment the bicycle rack comprises a base device for arranging the bicycle rack on a surface, preferably a ground surface. It is particularly preferred that the base device is connected with the wheel fixing means, in particular the fixing bodies. This connection between the base device and the wheel fixing means is in particular fixed, preferably permanently fixed. The connection may be designed as a single-piece connection, which may also be referred to as an integral connection. By means of a fixed or integral connection between the base device and the wheel fixing means, it is achieved in an advantageous manner that when the width of the receiving space is changed by movement, the base device is also changed and can thus be compressed advantageously. It is preferred that the base device substantially has the shape of a planar surface. The base device preferably has a polygonal shape. It is particularly preferred that the base device has a quadrilateral or hexagonal shape. Due to the straight sides of the polygonal shape it is advantageously possible to position a plurality of bicycle racks of the invention side by side by straight faces.

In a preferred embodiment the base device has a foot. It is particularly preferred that the base device has two feet. If the base device has two feet, it is preferred that one foot is connected with preferably only one fixing body, respectively. The connection between the foot and the fixing body is in particular fixed, particularly preferred integral. Advantageously, it is thus possible to move the feet along when the distance between the fixing bodies is changed, and to thereby influence the dimensions of the bicycle rack as a whole, in particular to compress the same.

In a preferred embodiment the bicycle rack has at least one connection device for a preferably temporary connection of the bicycle rack of the invention with another bicycle rack, in particular a bicycle rack of the invention. It is particularly preferred that the connection device is part of the base device. Preferably, the connection device is a contact and/or positive and/or material-bond and/or selectively couplable connection device.

It is preferred that the bicycle holder is symmetric, in particular mirror-symmetric. It is particularly preferred that the bicycle rack, when positioned on a surface, is mirror-symmetric with respect to at least one, in particular with respect to both vertical planes, e.g. the longitudinal and the transversal plane.

The single bicycle rack of the invention preferably is a single parking device. The single bicycle rack is designed for parking only a single bicycle. The single bicycle stand comprises a single bicycle rack of the invention having one or a plurality of the above described features.

The bicycle rack of the invention in particular is a device for parking in rows. The bicycle rack system comprises at least two bicycle racks of the invention connected with each other. It is preferred that the connection of the at least two bicycle racks is a contact and/or positive and/or material-bond and/or selectively couplable connection. It is particularly preferred that the connection of the at least two bicycle racks is made via the connection device. The connection of the at least two bicycle racks is preferably made via the base device of the bicycle racks.

BRIEF DESCRIPTION OF THE DRAWINGS

The invention will be described hereunder with reference to preferred embodiments and to the accompanying drawings.

In the Figures.

Similar or identical components or elements are identified by the same reference numerals or variations thereof (e.g. 10 and 10a and 10b). Elements may not be provided with reference numerals in all Figures, in particular for the sake of clarity.

DESCRIPTION OF THE INVENTION

Figure 1:
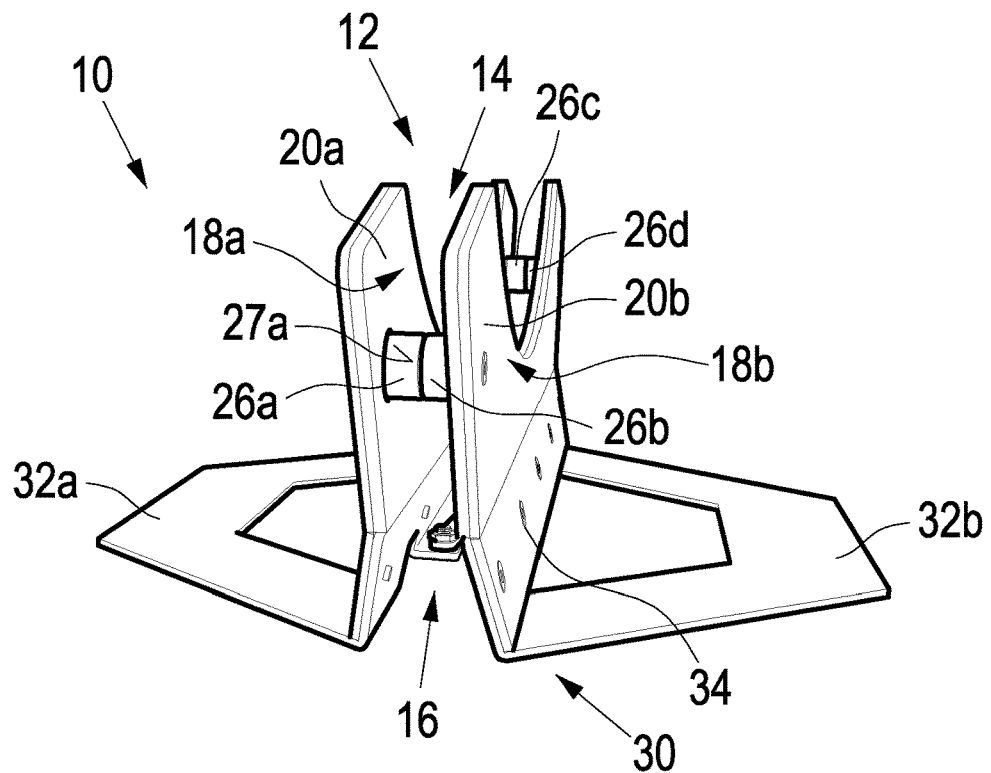
FIG. 1 is a perspective illustration of an embodiment of a bicycle rack of the present invention in a first state.

FIG. 1 shows an embodiment of a bicycle rack 10 of the invention. In addition, FIG. 1 also shows an embodiment of a single bicycle rack of the invention which only comprises the bicycle rack 10, and in particular is formed by the same.

The bicycle rack 10 has a wheel fixing means 12 comprising two fixing bodies 18a, 18b. A receiving space 14 for clampingly receiving a bicycle wheel extends between the fixing bodies 18a, 18b.

The fixing bodies 18a, 18b are movably connected with each other via a hinge device 16 illustrated as a scissors hinge. In the embodiment illustrated the deflection of the hinge device is the minimum so that the receiving space 14 has a minimum width. in this setting, the bicycle rack 10 can receive e.g. bicycles with narrow tires, such as racing bicycles.

The fixing bodies 18a, 18b each have one protrusion 26a-26d per side in the outer regions of the receiving space. The protrusions 26a and 26c of the first fixing body 18a are arranged to oppose the protrusions 26b and 26d of the second fixing body 18b with their end faces, respectively. With the minimum width of the receiving space illustrated, the protrusions 26a, 26b and 26c, 26d, which oppose each other with their end faces, are in contact. Here, the protrusions 26a-26d act as spacers.

In addition, the protrusions 26a-26d act as a wheel support for a bicycle wheel received in the receiving space 14. Thus, a received wheel is in contact with the outer surfaces 27 of the protrusions 26a-26d (as an example, only the outer surface 27a of protrusion 26a is identified by a reference numeral). In particular a part of the tread of the wheel is in contact with the outer surfaces of the protrusions 26a and 26b, whereby the wheel is advantageously prevented from moving to this side, and/or another part of the tread of the wheel is in contact with the outer surfaces of the protrusions 26c and 26d, whereby the wheel is advantageously prevented from moving to this other side. By this contact of the wheel with the protrusions 26a-26d the wheel is preferably fixed on one or both sides in the longitudinal direction and the wheel is prevented from rolling out forward or backward. It is particularly preferred that the bicycle wheel stands on the protrusions 26a-26d and is thus held in a raised position, i.e. spaced from the ground. Here, on the one hand, the bicycle wheel preferably stands at points on the outer surfaces of the protrusions 26a and 26b and, on the other hand, stands at points on the protrusions 26c and 26d. Accordingly, the protrusions 26a-26d act as a raised holder 26 (reference numerals 26a-26d) for a raised positioning of the bicycle wheel. Here, the bicycle wheel "sags" between the protrusions 26a-26d so that the function of the wheel contact preventing the wheel from rolling out (see above) is also achieved thereby. The protrusions 26a-26d form narrowings or closures of the receiving space 14 for fixing the wheel in the longitudinal direction. The wheel is fixed in the transversal direction, however, by the wheel being clamped by the fixing bodies 18a, 18b in the receiving space 14. Summarizing, the protrusions 26a-26d preferably serve three functions: spacers between the fixing bodies; wheel contact for preventing the bicycle wheel from rolling out; and raised holder 26 for a raised positioning of the bicycle wheel.

Further, the illustrated bicycle rack 10 comprises a base device 30. The base device 30 comprises two feet 32a, 32b. The foot 32a is connected with the fixing body 18a, while the foot 32b is connected with the fixing bods 18b. As illustrated, the connection is made respectively by means of a screw connection, using screws 34. On the other hand, for example an integral structure between the fixing body 18a, 18b and the foot 32a, 32b is also possible.

By means of the base device 30, the bicycle rack 10 can be positioned on a surface, in particular a ground surface.

Figure 2:
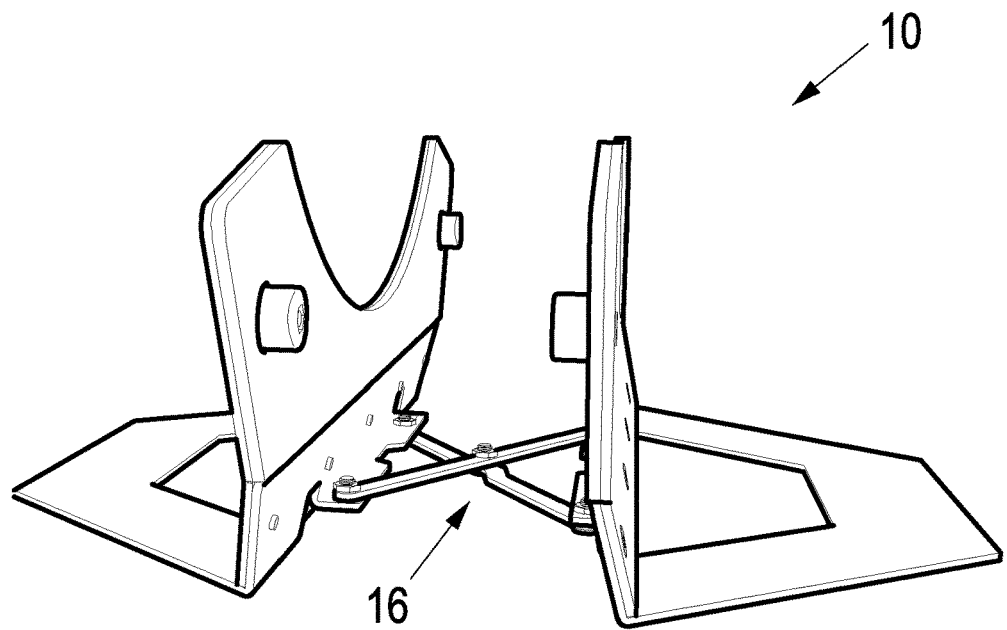
FIG. 2 is a perspective illustration of the bicycle rack of FIG. 1 in a second state.
Figure 3:
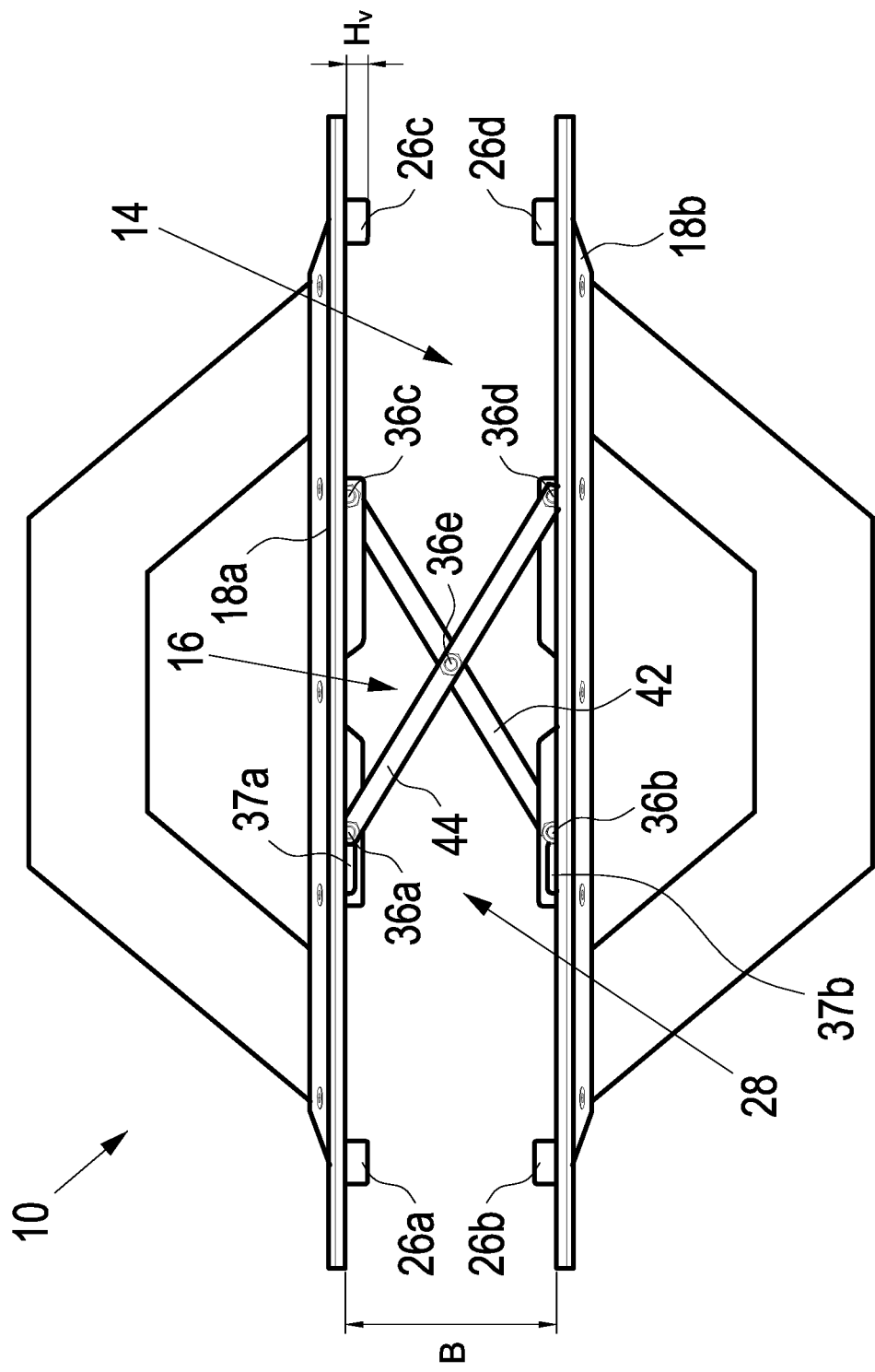
FIG. 3 is a top plan view of the bicycle rack of FIG. 2.

FIG. 2 shows the bicycle rack 10 of FIG. 1 with the hinge device 16 deflected to the maximum, while FIG. 3 is a top plan view thereof.

When deflected to the maximum, the receiving space 14 has a maximum width B, preferably of 130 mm (see FIG. 3)—while the minimum width B, illustrated in FIG. 1, is preferably 22 mm. With the width illustrated in FIG. 3, it is possible to park bicycles with particularly wide tires, e.g.

fatbikes, in the bicycle rack 10. Again, the treads of the wheel can be in contact with the protrusions 26a-26d and the wheel can thus be prevented from rolling out in the longitudinal direction.

The protrusions 26a-26d have a protrusion height H. This height is preferably 11 mm so that the protrusions 26a to 26d provide for a minimum width B of the receiving 22 mm (s. FIG. 1).

When deflected to the maximum (FIG. 3), the screws 36a, 36b are positioned in the slots 37a, 37b, deflected maximally in one direction. By means of the hinge device 36, in particular by means of a corresponding positioning of the screws 36a, 36b in the slots 37a, 37b, the width of the receiving space 14 can be varied correspondingly and thus bicycle wheels of different widths can be received.

Through the hinge device 36, the fixing bodies 18a, 18b are designed to be movable with respect to each other so that their mutual distance can be varied. For this purpose, the struts 42, 44 are movable by sliding, on the one hand, with the screws 36a, 36b in the slots 37a, 37b of the fixing bodies 18a, 18b, and on the other hand, are rotatable movable by means of the screws 36c, 36d. At the center, the struts 42, 44 are rotatably connected with each other by means of the screw 35e. The screws 36a-36e are preferably hexagon socket screws. By tightening at least one screw, in particular the screws 36a, 36b, hinge device 16 can be blocked. Thus, a blocking device 28 is realized.

Figure 4:
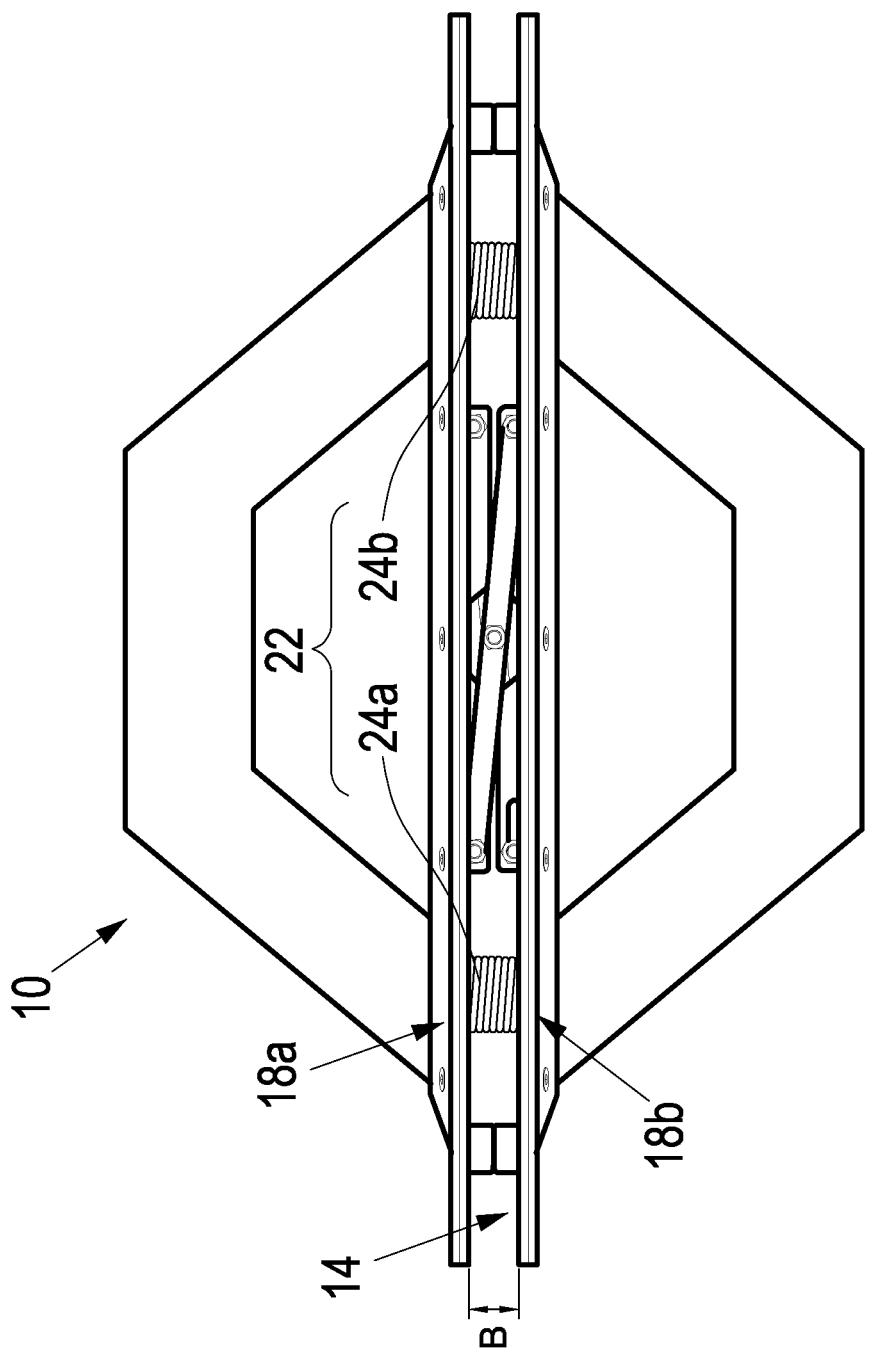
FIG. 4 is a top plan view of another embodiment of a bicycle rack of the present invention.

FIG. 4 is a top plan view on another embodiment of the bicycle rack 10. The bicycle rack 10 essentially corresponds to the bicycle rack 10 of FIG. 1 with a minimum width, in particular 22 mm, of the receiving space 14. Different from the embodiment of FIG. 1, the bicycle rack 10 of FIG. 4 comprises a pre-tensioning device 22. As illustrated, the pre-tensioning device 22 comprises two tension spring 24a, 24b.

These tension springs 24a, 24b are arranged between the fixing bodies 18a, 18b and are each connected with the same. The springs 24a, 24b urge the fixing bodies 18a, 18b towards each other and thus forces a minimum width B of the receiving space 14. Thereby, a self-clamping of a received wheel, on the one hand, and on the other hand, a self-compressing of the bicycle rack 10 as such are achieved.

Figure 5:
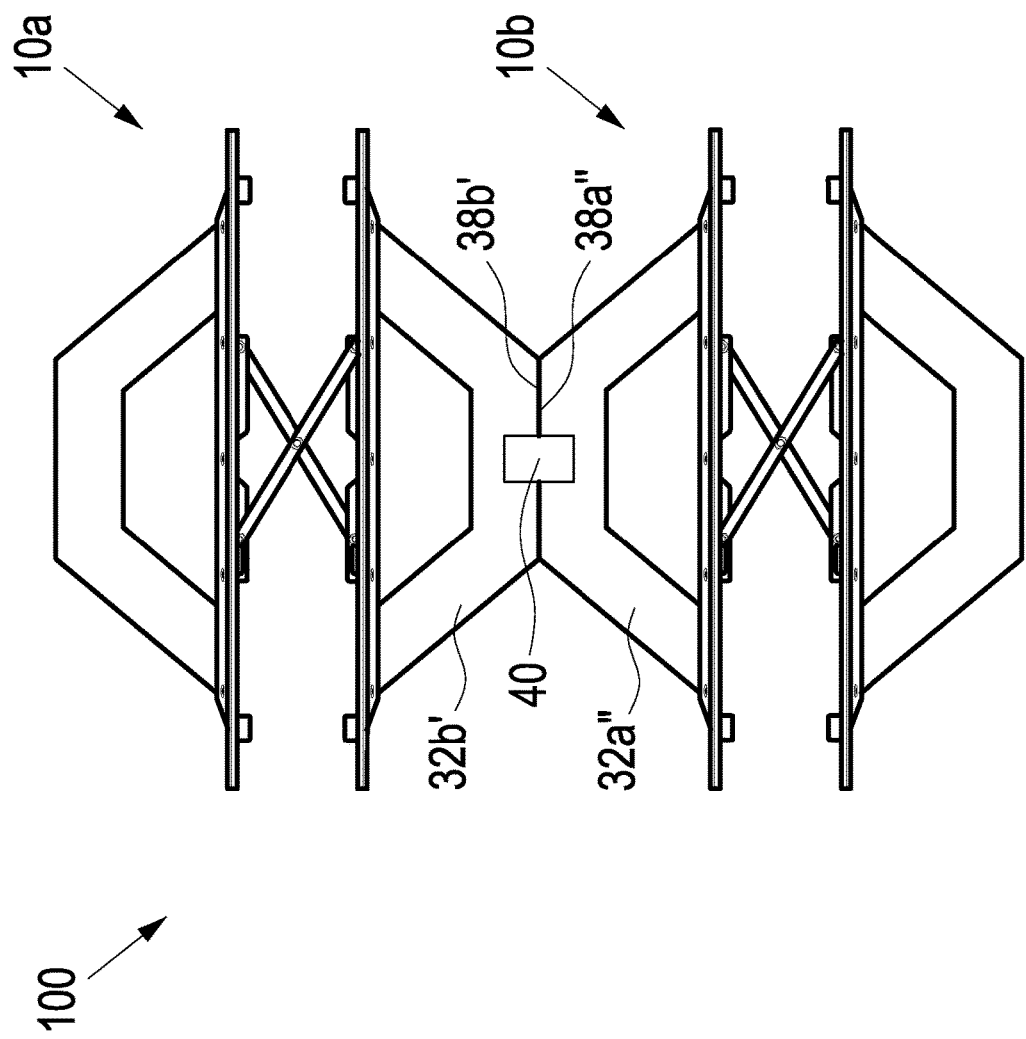
FIG. 5 is a top plan view of a bicycle rack system of the present invention.

FIG. 5 illustrates an embodiment of a bicycle rack system 100 of the invention comprising two bicycle racks 10a, 10b. The bicycle racks 10a, 10b correspond essentially to the bicycle rack 10 of FIG. 1. The bicycle racks 10a, 10b are illustrated abutting on each other by the straight sides 38b', 38a'' of the feet 32b', 32a''. Further, the feet 32b', 32a'' are connected with each other by a connection device 40. Preferably, the connection device 40 is a selectively couplable connection device, such as a bracket or a tensioning hook and/or a positive connection device 4β.

Instead of the design of the bicycle rack system 100 with a connection device 40, a bicycle rack system 100 (similar to FIG. 5) without a connection device 40 is also conceivable as an alternative, with the feet 32b', 32a'' merely being placed in abutment on each other.

It is also possible to connect more than two bicycle racks 10, in particular in a row, to form a bicycle rack system 100 for several bicycles.

Using the bicycle rack system 100, several bicycles can be parked, in particular in a row.

It is also possible to realize a bicycle rack system 100 in which the bicycle rack 10, in particular two bicycle holders 10, are arranged linearly and thus e.g. both wheels of a bicycle can be received.

The invention claimed is:

1. A bicycle rack comprising:
a wheel fixing means for fixing a bicycle wheel,
the wheel fixing means comprising a receiving space for receiving a wheel in a clamping manner,
the width of the receiving space being continuously variable for receiving different tire widths, and
a hinge device comprising a scissor hinge for changing the width of the receiving space, thereby changing the width of the bicycle rack in its entirety,
wherein the wheel fixing means comprises two opposing, parallel fixing bodies for forming the receiving space, and
wherein the scissor hinge comprises at least two struts, each of the at least two struts connected to the two opposing, parallel fixing bodies.

2. The bicycle rack according to claim 1, wherein the bicycle rack is a point-wise raised holder for a raised positioning of the bicycle wheel.

3. The bicycle rack according to claim 1, wherein each fixing body has a plane side wall.

4. The bicycle rack according to claim 1, wherein the hinge device connects the fixing bodies in a movable manner, the hinge device arranged entirely between the fixing bodies.

5. The bicycle rack according to claim 1, further comprising a pre-tensioning device urging the fixing bodies towards each other, the pre-tensioning device comprising at least one tension spring between the fixing bodies.

6. The bicycle rack according to claim 1, further comprising at least one protrusion between the fixing bodies, the at least one protrusion being designed as a spacer and/or a wheel contact and/or forming a raised holder.

7. The bicycle rack according to claim 6, wherein the at least one protrusion closes the receiving space on at least one side in a longitudinal direction to prevent the wheel from rolling out from the receiving space.

8. The bicycle rack according to claim 1, wherein the wheel fixing means, fixing bodies, or side walls comprise rubber, in particular elastomer, for fixing the bicycle wheel.

9. The bicycle rack according to claim 1, wherein the width of the receiving space can be changed variably between 0 mm and 150 mm.

10. The bicycle rack according to claim 1, further comprising a blocking device for a temporary fixing of the width of the receiving space.

11. The bicycle rack according to claim 1, further comprising a base device for arranging the bicycle rack on a surface, preferably a ground surface, the base device being connected with the wheel fixing means.

12. The bicycle rack according to claim 11, wherein the base device comprises two feet, one foot being connected with only one of the fixing bodies.

13. A single bicycle rack comprising the bicycle rack according to claim 1.

14. A bicycle rack system with at least two bicycle racks according to claim 1 connected in a contacting and/or positive fitting and/or material-bonding and/or selectively couplable manner, the bicycle racks being connected through a base device of the bicycle racks.

15. The bicycle rack according to claim 1, wherein the width of the receiving space can be changed variably between 22 mm and 130 mm.

16. The bicycle rack according to claim 1, wherein the bicycle rack is a double point-wise raised holder for a raised positioning of the bicycle wheel.

* * * * *